US006626530B2

(12) United States Patent
Snow et al.

(10) Patent No.: US 6,626,530 B2
(45) Date of Patent: Sep. 30, 2003

(54) PROCESS FOR MAKING PROTECTED PRINTED IMAGES

(75) Inventors: Larry Glen Snow, Leroy, NY (US); Robert G. Pembleton, Wilmington, DE (US); Edwin S. Iracki, Landenberg, PA (US); James John Schmidt, Getzville, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/041,790

(22) Filed: Oct. 25, 2001

(65) Prior Publication Data

US 2002/0150734 A1 Oct. 17, 2002

Related U.S. Application Data

(60) Provisional application No. 60/244,375, filed on Oct. 30, 2000.

(51) Int. Cl.[7] .................................................. B41J 2/01
(52) U.S. Cl. ...................................... 347/105; 428/32.1
(58) Field of Search ................................ 347/105, 106; 428/32.1, 195

(56) References Cited

U.S. PATENT DOCUMENTS

| | | | |
|---|---|---|---|
| 2,419,008 A | 4/1947 | Coffman et al. | |
| 2,510,783 A | 6/1950 | Johnston et al. | |
| 2,599,300 A | 6/1952 | Upson | |
| 2,953,818 A | 9/1960 | Bartron | |
| 3,133,854 A | 5/1964 | Simms | |
| 3,139,470 A | 6/1964 | Prengle | |
| 3,524,906 A | 8/1970 | Schmitt et al. | |
| 4,931,324 A | 6/1990 | Ellison et al. | |
| 5,225,260 A | 7/1993 | McNaul et al. | |
| 5,672,413 A | 9/1997 | Taylor et al. | |
| 5,707,697 A | 1/1998 | Spain et al. | |
| 5,766,398 A | 6/1998 | Cahill et al. | |
| 5,795,425 A | 8/1998 | Brault et al. | |
| 5,837,375 A | 11/1998 | Brault et al. | |
| 6,001,482 A | 12/1999 | Anderson et al. | |
| 6,013,354 A | * 1/2000 | Tomizawa et al. | 428/206 |
| 6,096,418 A | * 8/2000 | Sato et al. | 428/323 |
| 6,124,417 A | 9/2000 | Su | |
| 6,251,512 B1 | * 6/2001 | Gustafson et al. | 428/323 |
| 6,485,818 B2 | * 11/2002 | Fujita | 428/220 |

FOREIGN PATENT DOCUMENTS

| | | |
|---|---|---|
| EP | 1 024 020 A1 | 8/2000 |
| GB | 2330114 A | 4/1999 |
| WO | WO 99/65680 | 12/1999 |

OTHER PUBLICATIONS

W. E. Haas, "Non–Impact Printing Technologies" Chapter 13, pp 379–384, of *Imaging in Processes and Materials—Neblette's Eighth Edition*, Sturge, Walworth and Shepp, eds., Van Nostrand Reinhold, New York 1989.

Ronald L. Adams, "Phase Change Ink Jet Technology", pp 290–293, of Final Program and Proceedings of IS&T's Ninth International Congress on Advances in Non–Impact Printing Technologies, Oct. 4–8, 1993, Yokohama, Japan.

Stuart Howkins, "Physical Limitations on High Performance Piezo–electric Pusher Technology", pp 142–152 of Proceedings SPIE—The International Society for Optical Engineering, vol. 1912 Color Hard Copy and Graphic Arts II (1993).

* cited by examiner

*Primary Examiner*—Bruce H. Hess
*Assistant Examiner*—Michael E. Grendzynski

(57) ABSTRACT

A process for making an article with an image protected by a clear fluoropolymer film includes coating the inner surface of the fluoropolymer film with a layer of hydrophobic, ink receptive polymer composition compatible with the fluoropolymer film. An image is printed on the layer of hydrophobic, ink receptive polymer composition using an inkjet printhead supplied with a non-aqueous solvent based ink. The clear, printed fluoropolymer film is then adhered to a substrate with the inner surface facing the substrate whereby the image is viewable through and protected by the fluoropolymer film.

17 Claims, No Drawings

PROCESS FOR MAKING PROTECTED PRINTED IMAGES

FIELD OF INVENTION

This invention relates to a process for making an article with a printed image protected by a clear fluoropolymer film.

BACKGROUND OF THE INVENTION

Fluoropolymer films have long been used as a protective and decorative overlay for a variety of substrates such as metal, wood, and thermoplastic and thermoset polymers. With its excellent chemical resistance and weathering properties, a thin layer of fluoropolymer film can protect less durable substrates from damage in both exterior and interior use. Clear fluoropolymer overlay films have also been used to protect images on printed substrates.

The very properties that make fluoropolymer films desirable for outdoor use hinder the ability of fluoropolymer substrates to directly receive images. Fluoropolymer resins are known for their low surface energy and non-stick properties as well as thermal and chemical resistance. For these reasons fluoropolymer films withstand the effects of dirt, stains, graffiti and sun. However, these fluoropolymer compositions do not stick easily to other materials, especially dissimilar materials. Many commercial inks tend to puddle on fluoropolymer surfaces.

Direct printing on fluoropolymer film is described in EP 1,024,020 to Kume et al. wherein fluoropolymer-containing ink is applied to fluoropolymer films by using thermal transfer techniques. And although there is compatibility between the ink and the film, the images are described as directly exposed to the elements of weather.

U.S. Pat. No. 5,225,260 to McNaul et al. discloses that fluoropolymer films, such as polyvinyl fluoride, have been used as substrates for outdoor signage. Images are printed on a fluoropolymer film and adhered to vehicles such as trucks and truck trailers for purposes of identification, advertising, instructional information and the like. In order for the polyvinyl fluoride film to receive such images the film is surface treated. For these vehicle applications as well as for custom interior surface decoration, it has been common to rely on screen printing techniques to produce images on the fluoropolymer film. However, screen printing techniques require that individual masks be produced for each new image. Minor changes in graphics or design require a new mask. Mask production is inflexible and expensive, especially if only a few signs are produced. In addition, in order to achieve adherability and durability on fluoropolymer surfaces, most screen printing inks require oven baking or exposure to an ultraviolet curing step.

More recently, the advantages of ink jet printing have been recognized. High quality color images can be produced for a wide range of applications at a low cost. The technology is extremely versatile permitting production of signs and displays of all sizes, including fliers, posters, banners and billboards. Images can be stored digitally and be modified easily and frequently.

In general, inkjet processes form images by depositing ink droplets emanating from nozzles onto substrates. Thermal bubblejet processes (commonly referred to as thermal ink jet printers) promote a phase change in the ink by resistive heating. Most commonly, aqueous-based inks are heated and the resulting steam expels an ink droplet from the nozzle onto the substrate. The substrate must be able to quickly absorb the deposited ink droplets to avoid blurring the printed image. Therefore, much attention has been directed to formulating a water absorptive ink receptive layer to be applied to the substrate prior to printing. This is especially true if the substrate is a plastic film or sheet rather than paper.

So although thermal ink jet printers provide the advantage of digital manipulation, the need for water absorbing layers are expensive and prone to damage by water in the environment. Perhaps better suited to plastic substrates are ink jet processes that have solvent-based inks, where the solvent is more quickly vaporized or absorbed. Solvent based ink jet printing makes printing on some synthetic polymer films possible. One particularly useful inkjet process that uses solvent-based ink is piezoelectric printing. Piezoelectric printing involves applying a voltage to a piezoelectric crystal to cause a pressure pulse in the printhead to emit droplets of ink. However it has been found that even treated fluoropolymer has not been receptive to commercial piezoelectric printers. Owing to their chemical resistance, fluoropolymer films are difficult or impossible to print on directly by this technique. The advantages of digital printing in combination with fluoropolymer protection without the drawbacks of water absorbing layers could be achieved if a means to print on fluoropolymers with piezo ink jet printing techniques could be found.

There is a need for an ink receptive composition for solvent-based inks that can be used with a clear, weatherable fluoropolymer film. Such a composition would permit formation of protected images by a digital inkjet printer. There is also a need for a compatible adhesive to adhere printed fluoropolymer films to substrates.

BRIEF SUMMARY OF THE INVENTION

The present invention relates to a process for making an article with an image protected by a clear fluoropolymer film. The process includes coating the inner surface of the fluoropolymer film with a layer of hydrophobic, ink receptive polymer composition compatible with the fluoropolymer film. An image is printed on the layer of hydrophobic, ink receptive polymer composition using an inkjet printhead supplied with a non-aqueous solvent based ink. The clear, printed fluoropolymer film is then adhered to a substrate with the inner surface facing the substrate whereby the image is viewable through and protected by the fluoropolymer film.

Preferred polymers for the hydrophobic, ink receptive coating are amine functional polymers and aliphatic polyesters and their crosslinked polyester-urethane products. In one embodiment, the hydrophobic, ink receptive polymer composition is a heat activatable adhesive and the process of adhering includes applying heat to activate the heat activatable adhesive. Preferably, the hydrophobic, ink receptive polymer composition employs an amine functional acrylic copolymer. In another embodiment, the process of adhering is achieved by applying a pressure sensitive adhesive to the inner surface of the protective film after printing and applying pressure to activate the pressure sensitive adhesive.

The present invention provides a process for making an article with an image protected by a clear fluoropolymer film. The fluoropolymer film with a layer of hydrophobic, ink receptive polymer composition enables the reverse printing of good quality printed images directly on the fluoropolymer film using an inkjet printhead supplied with a non-aqueous solvent based ink.

DETAILED DESCRIPTION OF THE INVENTION

Fluoropolymer Film

The present invention is applicable to a wide range of fluoropolymer films such as those prepared from polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, vinyl fluoride, among others and including blends thereof and blends of fluoropolymers with nonfluoropolymers. For example, the fluoropolymer may be a fluorinated ethylene/propylene copolymer, i.e., FEP resins, a copolymer of ethylene/tetrafluoroethylene, a copolymer of tetrafluoroethylene/perfluoro(propyl vinyl ether), a copolymer of ethylene/chlorotrifluoroethylene, vinylidene fluoride/hexafluoropropylene, and vinylidene fluoride/perfluoro (alkyl vinyl ether) dipolymers and terpolymers with tetrafluoroethylene, polyvinylidene fluoride homopolymer (PVDF), polyvinyl fluoride homopolymer (PVF), among others.

The fluoropolymer may contain one or more light stabilizers as additives and, when assembled into the article of this invention, a light stabilizer protects the printed image by reducing the damage caused by exposure to sun. Light stabilizer additives include compounds that absorb ultraviolet radiation such as hydroxybenzophenones and hydroxybenzotriazoles. Other possible light stabilizer additives include hindered amines light stabilizers (HALS) and antioxidants.

The fluoropolymer film of this invention is clear and the image printed on the inner surface of the film and is visible through the polymer film. By clear it is meant that the polymer film is optically clear. Thus, the polymer film may be transparent or tinted with the image being visible therethrough. If the image is a design that requires a certain orientation or a word that should be readable through the polymer film, the image is preferably reverse printed on the inner surface. In this invention where the image is printed on the inner surface of the film, the polymer film serves as a protective covering with the image sandwiched between the fluoropolymer polymer film and a substrate. The clear fluoropolymer film protects the image from wear, moisture, stains, chemicals, sun, graffiti and the like. Fluoropolymers are especially well suited to this invention because of their chemical and thermal resistance and nonstick properties.

The present invention is preferably employed with polyvinyl fluoride (PVF) films. Other preferred films for use in the present invention are made from fluorinated ethylene/propylene copolymer, ethylene/tetrafluoroethylene copolymer, perfluoro(alkyl vinyl ether), polyvinylidene fluoride (PVDF) or from a blend of fluoropolymer, e.g, PVDF and nonfluoropolymer, e.g., acrylic polymers.

The fluoropolymer film can be made from fluid compositions that are either (1) solutions or (2) dispersions of fluoropolymer. Films are formed from such solutions or dispersions of fluoropolymer by casting or extrusion processes. In the case of fluoropolymers that are melt processible, melt extrusion processes are possible. Both oriented and unoriented fluoropolymer films can be used in the practice of the present invention. Increased clarity is often achieved when printing occurs on cast, unoriented films.

Typical solutions or dispersions for polyvinylidene fluoride or copolymers of vinylidene fluoride are prepared using solvents that have boiling points high enough to avoid bubble formation during the film forming/drying process. The polymer concentration in these solutions or dispersions is adjusted to achieve a workable viscosity of the solution and in general is less than about 25% by weight of the solution. A suitable fluoropolymer film is formed from a blend of polyvinylidene fluoride, or copolymers and terpolymers thereof, and acrylic resin as the principal components as described in U.S. Pat. Nos. 3,524,906; 4,931,324; and 5,707,697.

In the preferred form of the invention using films of polyvinyl fluoride (PVF), suitable films can be prepared from dispersions of the fluoropolymer. The nature and preparation of such dispersions are described in detail in U.S. Pat. Nos. 2,419,008; 2,510,783; and 2,599,300. Suitable PVF dispersions can be formed in, for example, propylene carbonate, N-methyl pyrrolidone, γ-butyrolactone, sulfolane, and dimethyl acetamide. The concentration of PVF in the dispersion will vary with the particular polymer and the process equipment and the conditions used. In general, the fluoropolymer will comprise from about 30 to about 45% by weight of the dispersion.

Films of polyvinyl fluoride may be formed by extrusion procedures such as those described in U.S. Pat. Nos. 3,139,470 and 2,953,818. These patents describe the feeding of polyvinyl fluoride dispersion to a heated extruder that is connected to a slotted casting hopper. A tough coalesced extrudate of polyvinyl fluoride is extruded continuously in the form of a film containing latent solvent. The film can be merely dried or, alternately, can be heated and stretched in one or more directions while the solvent is volatilized from the film. When stretching is used, oriented film is produced. Alternatively, films of polyvinyl fluoride can be cast from dilute dispersions of the polymer in latent solvent and unoriented films are produced.

In fluoropolymer film casting processes, the fluoropolymer is formed into its desired configuration by casting the dispersion onto a support, by using any suitable conventional means, such as spray, roll, knife, curtain, gravure coaters, or any other method that permits applying a substantially uniform film without streaks or other defects. The thickness of the cast dispersion is not critical, so long as the resulting film has sufficient thickness to be self-supporting and be satisfactorily removed from the substrate onto which the dispersion is cast. In general, a thickness of at least about 0.25 mil (6.4 μm) is satisfactory, and thicknesses of up to about 15 mils (381 μm) can be made by using the dispersion casting techniques of the present invention. A wide variety of supports can be used for casting films according to the present invention, depending on the particular polymer and the coalescing conditions. The surface onto which the dispersion is cast should be selected to provide easy removal of the finished film after it is coalesced. While any suitable support can be employed for casting the fluoropolymer dispersion, examples of suitable supports include polymeric films or steel belts.

After casting the fluoropolymer dispersion onto the support, the fluoropolymer is then heated to coalesce the fluoropolymer into a film. The conditions used to coalesce the polymer will vary with the polymer used, the thickness of the cast dispersion, among other operating conditions. Typically, when employing a PVF dispersion, oven temperatures of from about 340° F. (171° C.) to about 480° F. (249° C.) can be used to coalesce the film, and temperatures of about 380° F. (193° C.) to about 450° F. (232° C.) have been found to be particularly satisfactory. The oven temperatures, of course, are not representative of the temperatures of the polymer being treated, which will be lower. After coalescence, the finished film is stripped from the support by using any suitable conventional technique.

In a preferred embodiment, the surface of the fluoropolymer film is surface treated to enhance adherability. The surface treatment can be achieved by exposing the film to a gaseous Lewis acid, to sulfuric acid or to hot sodium hydroxide. Preferably, the surface can be treated by exposing one or both surfaces to an open flame while cooling the opposite surface. Treatment to enhance adherability can also be achieved by subjecting the film to a high frequency, spark discharge such as corona treatment. Additional treatments such as alkali metal bath treatments or ionizing radiation, e.g., electron beams, may also be useful.

Hydrophobic, Ink Receptive Polymer Composition

The ink receptive polymer coating used for this invention has multiple requirements and functions. It is compatible with the fluoropolymer protective film. By "compatible" it is meant that solutions of the ink receptive coating will wet the fluoropolymer surface when applied and develop strong adhesion to the fluoropolymer surface during drying. The ink receptive composition, after drying, is preferably not tacky at room temperature allowing for transport of coated films. It is optically clear as described above for the fluoropolymer film. It is hydrophobic and therefore, unlike hydrophilic coatings, does not absorb moisture from the environment during outdoor use that can attack the integrity of the coating and/or the ink. It receives and adheres to non-aqueous solvent-based inks deposited from inkjet devices. And in one preferred embodiment, it is adherable to substrates without the need for additional adhesive as will be described below. If an additional adhesive, such as a pressure sensitive adhesive, is applied to bond the fluoropolymer film to the substrate, the ink receptive composition is compatible with the pressure sensitive adhesive.

To produce high quality images using solvent based inks in piezoelectric printers, it is preferred that the coating of hydrophobic, ink receptive polymer composition preferably provides balanced solvent absorption of the solvent in the non-aqueous solvent based ink. By "balanced solvent absorption" is meant that wetting followed by sufficient absorption of solvent in the non-aqueous solvent based ink occurs on the hydrophobic ink receptive polymer layer to fix the ink but without causing crazing or complete solution of the coating. To achieve balanced solvent absorption, the properties of the hydrophobic, ink receptive polymer coating should be matched with the solvent of the particular ink being used as explained in more detail below.

First, the hydrophobic, ink receptive polymer coating is preferably capable of being wet effectively by the solvents of the non-aqueous solvent based ink. Otherwise, the ink will attempt to minimize the contact surface area leaving image defects associated with dewetting and will produce poor adhesion in areas where ink is deposited.

Second, the coating is preferably able to absorb sufficient portion of the ink solvent to achieve ink fixing. Sufficient absorption causes fixing of the printed dots in the positions as intended and prevents the merging of numerous dots into puddles that upon drying produce a distorted blurry image. Moreover, the absorption of the ink solvent also helps to speed drying to the touch, which speeds production. Solvent absorption also promotes strong adhesion between the ink and the ink receptive polymer coating.

Finally, while the ink receptive polymer coating preferably absorbs some portion of the ink solvent, in so doing the ink receptive polymer preferably does not undergo crazing or complete solution. In this regard, crosslinking of the polymer in the coating is found to be beneficial. If crazing occurs, the fractures in the coating will allow substrate to show through the image muting the crispness of the colors.

If solution of the coating occurs, the fluoropolymer may be exposed and dewetting phenomena may occur. In addition, if solution of the coating polymer into the ink occurs, the coating polymer may interact adversely with the ink dispersion quality causing pigment flocculation and the accompanying loss of color strength.

The above set of desired coating and ink solvent interactions to achieve balanced solvent absorption determines the characteristics of a coating composition for a specific ink system, Hydrophobic ink receptive polymer compositions that are useful in the present invention include: amine functional polymers; aliphatic polyesters such as those derived from adipic acid and aliphatic diols such as 1,2-ethanediol, 1,4-butanediol and 1,6-hexanediol; and their crosslinked polyester-urethane (PEU) products derived from combination of the polyester diol with aliphatic polyisocyanates such as the isocyanurate or biuret trimers of hexamethylenediisocyanate.

Preferred crosslinked polyester-urethane products include: (1) aliphatic polyester urethane (PEU) from adipic acid based polyester Pliobond-4549 Ashland, Dublin Ohio)+ hexamethylenediisocyanate trimer, Desmodur-3300 (Bayer, Pittsburgh, Pa.) and (2) aliphatic polyester urethane (PEU) from adipic acid based polyester Pliobond-4464 (Ashland)+ hexamethylenediisocyanate trimer, Desmodur-3300 (Bayer).

The amine functional polymers useful for this invention may include but are not limited to acrylic polymers, polyamides, polyurethanes, polyesters, polyaziridines, and epoxy polymers. One preferred form of the amine functional polymer is an amine functional acrylic copolymer described in U.S. Pat. No. 3,133,854 to Simms. These amine functional acrylic copolymers comprise a vinyl addition polymer having substituents each bearing a hydroxyl radical and an amino radical bonded to adjacent carbon atoms. The amino radical bears at least one active hydrogen atom and the amino radicals in the substituents contain from 0.01 to 1.0% amino nitrogen based on the weight of the polymer. Preferably, such vinyl addition polymers are prepared by copolymerizing one or more ethylenically unsaturated monomers with a small portion of monomer containing pendent epoxy substituents, for example, by well known methods of bulk, solution, emulsion or granular polymerization in the presence of free radical catalysts. The resulting copolymer is then reacted with ammonia or a primary monoamine to yield the polymers used herein. Alternately, ammonia or a primary monoamine can be reacted with an ethylenically unsaturated monomer containing a pendent epoxy substituent and the resulting ammoniated or aminated monomer copolymerized with another, and epoxy-free, vinyl monomer.

Examples of vinyl monomers which can be used as the major constituent of the vinyl polymers used in the ink receptive compositions of this invention are derivatives of alpha, beta-unsaturated acids including methyl acrylate, ethyl acrylate, cyclohexyl acrylate, benzyl acrylate, naphthyl acrylate, octyl acrylate, tertiary-butyl acrylate, methyl methacrylate, ethyl methacrylate, butyl methacrylate, octyl methacrylate, stearyl methacrylate, butyl ethacrylate, ethyl alpha-chloroacrylate, ethyl alpha-phenylacrylate, dimethyl itaconate, ethyl alpha-methoxy acrylate, propyl alpha-cyanoacrylate, hexyl alpha-methylthioacrylate, cyclohexyl alpha-phenylsulfonyl acrylate, tertiarybutyl ethacrylate, ethyl crotonate, 2-hydroxypropyl acrylate, 2-hydroxypropyl methacrylate, 2-hydroxyethyl acrylate, 2-hydroxyethyl methacrylate, n-butyl acrylate, 2-ethylhexyl acrylate, 2-ethylhexyl methacrylate, lauryl acrylate, lauryl methacrylate, dimethyl maleate, isopropyl cinnamate, butyl beta-methoxyacrylate, cyclohexyl beta-chloroacrylate, acrylamide, alpha-phenylacrylamide, methacrylamide, N,N-dimethylacrylamide, N-cyclohexylmethacrylamide, itaconamide, acrylonitrile, crotonitrile, alpha-chloroacrylonitrile, methacrylonitrile, alpha-phenylacrylonitrile, N-phenyl maleimide, N-butyl itaconamide and mixtures thereof; vinyl derivatives such as vinyl acetate, vinyl benzoate, vinyl pimelate, vinyl stearate, vinyl methyl ether, vinyl butyl either, vinyl phenyl sulfide, vinyl dodecyl sulfide, vinyl butyl sulfone, vinyl cyclohexyl sulfone, vinyl chloride, vinyl fluoride, N-vinyl benzenesulfonamide, N-vinyl acetamide, N-vinyl caprolactam, styrene and vinyl toluene; allyl derivates such as allyl phenyl ether, allyl cyclohexylacetate. N,N-dimethylallylamine, ethyl allyloxyacetate, allylbenzene, allyl cyanide and allyl ethyl sulfide; methylene type derivates such a diethyl methylenemalonate, diketene, ethylene glycol ketene acetal, methylene cyclopentane, vinylidene chloride and vinylidene disulfones; miscellaneous compounds such as vinylene carbonate, acrolein acetals, methyl vinyl ketones, vinyl phosphonates, allyl phosphonates, vinyl trialkoxysilanes; and mixtures thereof. Of the aforementioned, epoxy-free vinyl monomers, acrylic esters, particularly esters of acrylic and methacrylic acids with 1 to 8 carbon-atom alkyl-, aryl- or cyclo-aliphatic alcohols are preferred.

Epoxy containing monomers that can be used in forming the composition are for example glycidyl methacrylate, glycidyl acrylate, allyl glycidyl ether, butadiene monoepoxide, vinyl-cyclohexene epoxide, glycidyl oxyethyl vinyl sulfide, glycidyl sorbate, glycidyl ricinoleate, glycidyl vinyl phthalate, glycidyl allyl phthalate, glycidyl allyl maleate, glycidyl vinyl ether, allyl alpha, beta-epoxyisovalerate and mixtures thereof. Glycidyl acrylate and methacrylate are particularly preferred because they can be copolymerized readily in small controlled amounts and the epoxy group introduced thereby reacts readily and substantially completely with ammonia and amines.

In the alternative, amine functional acrylic copolymers are formed by using acrylic acid or methacrylic acid in place of the epoxy containing monomers and reacting the acid with an aziridine to form a primary amine, preferably ethylene imine or propylene imine.

Especially preferred for this invention are primary amine functional acrylic copolymers, preferably monoalkyl amines of C8 or less. For example, methyl methacrylate/butyl methacrylate/glycidyl methacrylate (32.5164.0/3.5) is post reacted with ammonia to produce a primary amine functional acrylic copolymer and methyl methacrylate/glycidyl methacrylate (98/2) is post reacted with ammonia to produce a primary amine functional acrylic copolymer. Another example of a preferred amine functional acrylic copoloymer includes methyl methacrylate/butyl methacrylate/2-hydroxy-3-aminopropyl methacrylate 32/64/4 copolymer.

As discussed above, crosslinked ink receptive polymer coatings are beneficial in providing balanced solvent absorption of ink solvent in order to avoid crazing or complete solution. Thus, an example of a preferred crosslinked ink receptive coating composition is a coating of methyl methacrylate/butyl methacrylate/butyl acrylate/1-aminoisopropyl methacrylate 33/44/8/15 and bisphenol-A diglycidyl ether crosslinker (Epon 828 from Shell), 14 parts acrylic to 1 part epoxy crosslinker Suitable solvents for application of the amine functional polymer to the fluoropolymer film are any of a variety of volatile solvents such as toluene, xylene, butanol, pentanol, isopropanol, cyclopentane, octane, ethoxythanol, and other aliphatic, cycloaliphatic, and aromatic hydrocarbons, alcohols, ethers and mixtures thereof. Concentration of the amine functional polymers in such solutions is usually about 10% to about 40% by weight. Any of a variety of coating methods may be used including, for example, spraying, dipping, roll coating, etc.

The ink receptive composition may contain one or more light stabilizers as additives and, when assembled into the article of this invention, a light stabilizer protects the printed image by reducing the damage caused by exposure to sun. Light stabilizer additives include compounds that absorb ultraviolet radiation such as hydroxybenzophenones and hydroxybenzotriazoles. Other possible light stabilizer additives include hindered amines light stabilizers (HALS) and antioxidants.

The hydrophobic ink receptive composition is coated on fluoropolymer film that preferably has been activated to improve adhesion. Preferably, coating is accomplished by applying to at least one surface of the film a solution of the hydrophobic ink receptive composition to form a layer, when dried, of from 1–50 µm thick, more preferably 2.5–8 µm thick, of hydrophobic ink receptive composition. The coated fluoropolymer film is passed through an oven of approximate temperature of from 100 to 300° F. (38 to 149° C.) which dries the composition to form a coated film and thereby confers ease of handling, in that the coated film can be rolled and stored or shipped if desired.

In one preferred embodiment, the hydrophobic ink receptive composition is also a heat activatable adhesive. The amine functional acrylic polymers described in U.S. Pat. No. 3,133,854 to Simms, are disclosed as adhesive layers having both high adhesive and high cohesive strength and which are weather resistant and readily formable into a wide variety of shapes without loss of interlayer adhesion or cohesion. The adhesive properties of the composition are activated by heat. For example, a substrate and a film coated with the composition are heated in a nip at a temperature of from 125 to 300° C., preferably 150 to 250° C. for a few seconds to 10 minutes at sufficient pressures to bring the layers into intimate contact. Suitable bonds have been formed when certain acrylic amine functional copolymers are heated for as little as 1–3 seconds at temperatures of 160 to 200° C.

It is most surprising that a composition commonly used to bond fluoropolymer films to various substrate materials can also function as an ink receptive composition for digital inkjet printers.

Inks and Printers

Articles of this invention are made by printing an image on the surface of a fluoropolymer film having a layer of hydrophobic, ink receptive composition. The image is printed using an inkjet printhead supplied with a non-aqueous solvent-based ink. In a preferred embodiment, the printhead is operated by applying a voltage pulse to a piezoelectric crystal in contact with a supply of the non-aqueous solvent based ink resulting in generating a pressure pulse in the inkhead for emission of said ink. A commercial piezoelectric inkjet printer useful in this invention is a VUTEk® UltraVu 2360 SC printer sold by VUTEk, Meredith, N.H.

The ink compositions are non-aqueous and contain solvents that preferably promote balanced solvent absorption on ink receptive polymer layer as discussed above. A solvent which is used in inks of this type is 2-butoxyethyl acetate.

Substrates

Articles of this invention are made by adhering clear fluoropolymer film to a substrate. For the purposes of the description of this invention, the "inner surface" of the fluoropolymer film" is the surface of the film that has hydrophobic, ink receptive composition with printed image. The fluoropolymer film is adhered to the substrate so that the inner surface is adhered facing the substrate and the image is viewable through and protected by the fluoropolymer film.

The substrate functions as a support for the protected image. Many different substrates are useful for this invention. Some examples include metal substrates, particularly iron, steel, aluminum, stainless steel; glass, porcelain or ceramics; textile fabrics, paper, cardboard, wood, plywood, cement board or plastics. Polymeric substrates may be either thermoplastic or thermosetting materials. Typical polymeric substrates include but are not limited to rigid or flexible polyvinyl chloride (PVC), acrylics, PVC/acrylic blends, polycarbonate, polystyrene, ABS (acrylic-butadiene-styrene), thermoplastic or unsaturated polyesters, phenolics, epoxies, engineering thermoplastics, among others.

Preferably these substrates are in the form of sheets or films either flexible or rigid. The substrates may vary in size, shape and topography.

One method for adhering the inner surface of the fluoropolymer film to the substrate as described above is to apply heat to activate the adhesive nature of the hydrophobic ink receptive composition. Alternately, a pressure sensitive adhesive can be applied to the inner surface of the fluoropolymer film already having a hydrophobic ink receptive composition and printed image and applying pressure to activate the pressure sensitive adhesive. The pressure sensitive adhesive adheres to and is compatible with the ink receptive layer and the substrate. The adhesive may be optically clear as described above for the fluoropolymer film or may be white or may be of any suitable color to provide proper contrast for the printed image. The adhesive creates a strong adhesive bond between fluoropolymer film and substrate.

Suitable pressure sensitive adhesives include those based upon acrylic homo- or copolymers and/or vinyl acetate homo- or copolymers. One especially preferred adhesive is a pressure sensitive white transfer adhesive Flexmount TT 200 EXV-630 White available from Flexcon, Spencer, Me. Other especially preferred pressure sensitive adhesives are Avery White Transfer Tape 720W (white) and 720 (clear).

The articles of this invention have outstanding weather resistance, abrasion resistance, solvent resistance, formability and excellent interlayer adhesion and resistance to delamination. They are resistant to chemicals, dirt, stains, graffiti, and deterioration by the sun's rays. Examples of the many applications include signs, posters, billboards and banners of all sizes from those produced on office copiers to those produced by grand format printing. Because of their graffiti resistance, the articles of this invention have application for graphics and decorative laminates for both the interiors and exteriors of aircraft, automobiles, trucks, buses and trains. Such articles also have applicability in architectural structures, cargo containers and marine applications.

Test Methods

Print Adhesion Tests

1. Fingernail Adhesion

The fingernail scratch test involves the use of the fingernail, to chip or peel away the printed image from the film. Good print adhesion is judged by the distinctively increased difficulty in effacing the print from the film and the visual inspection of the quality of the print remaining.

2. Pressure Sensitive Tape—ASTM method D 3359A

The pressure sensitive adhesive tape test involves applying an aggressive pressure sensitive adhesive tape to the film surface and removing the tape. A modification of the specified ASTM test is conducted using the edge of the coating instead of the specified crosshatching due to the relatively thin film substrates involved. By edge of the coating, it is meant, the area at the junction between a coated fluoropolymer film and uncoated flluoropolymer film. The procedure includes printing a sample substrate and applying a 3 inch×1 inch (7.5 cm×2.5 cm) piece of aggressive pressure sensitive adhesive tape (minimum 2000 g/in peel strength) that covers the junction between coated fluoropolymer film and uncoated fluoropolymer film. The tape is firmly pressed into place with a blunt object (in these examples, a scissors handle). The tape is peeled rapidly from the uncoated end to coated end of sample at nearly 180 degrees. The extent of coating and ink removal is evaluated. Good print adhesion is judged by the distinctively increased difficulty in effacing the print from the film and the visual inspection of the quality of the print remaining.

Weathering Test

Accelerated weathering performance of film structures and laminates formed from the film structures is determined in accordance with SAE J1960 using a xenon arc accelerated weathering apparatus available form the Atlas Company, Chicago, Ill.

EXAMPLES

Example 1

PVF Film with Amine Functional Acrylic Copolymer Receptive Coating

A clear protective fluoropolymer film is made, coated with a hydrophobic, ink receptive composition, printed with an image using an inkjet printhead supplied with a non-aqueous solvent based ink.

Fluoropolymer dispersion is formed by combining and mixing the ingredients listed below (parts are by weight) in a lightening mixer followed by dispersing the mixture in a Netzsch mill using glass beads.

| | |
|---|---|
| Poly(vinyl fluoride) | 35 parts |
| Propylene carbonate | 65 parts |
| TINUVIN ® 1130 UVA | 0.35 parts |
| TINUVIN ® 770 HALS | 0.1 parts |

A clear protective polyvinyl fluoride (PVF) film is made by casting the resulting dispersion onto a temporary polyethylene terephthalate (PET) carrier of approximately 3 mils using a reverse gravure process and a 35 TH (tri-helical) gravure roll. Once coated the wet dispersion is passed through a 3-stage air floatation oven at 80 ft (24 m) per minute. The first oven stage is set at 425° F. (218° C.) and the other 2 stages are set to 390° F. (199° C.). Upon exiting the oven, the film is corona discharge treated at 16 watt-minutes per square foot (1.5 watt-minutes per square meter). This process produces a 1 mil (25 $\mu$m) thick polyvinyl fluoride film possessing a surface treatment for bonding to an ink receptive composition.

An ink receptive coating solution is prepared by combining the following ingredients (parts are by weight) and stirring with a lightening mixer.

| Amine functional acrylic polymer solution* | 100 parts |
| --- | --- |
| TINUVIN ® 1130 UVA | 7.5 parts |

*methyl methacrylate/glycidyl methacrylate (98/2) post reacted with ammonia to convert the glycidyl groups into 2-hydroxy-3-aminopropyl groups to produce a primary amine functional acrylic copolymer in a solvent of toluene and isopropanol The resulting solution is coated onto the corona discharge treated polyvinyl fluoride film using a reverse gravure process and a 50 TH gravure roll at a line speed of 125 feet (38 m) per minute. The drying oven is set to 200° F. (93° C.) for this step.

The resulting 3-layer film is then used as a base for printing in a VUTEk® UltraVu 2360 SC printer (VUTEk, Meredith N.H.). Printing at 40 ft (12 m) per hour with Inkware type 3 solvent based inks (containing 2-butoxyethyl acetate) in this piezoelectric drop-on-demand ink jet printer, images are produced in which the ink adheres to the acrylic coated film. The films are subjected to 1) a fingernail scrape test and 2) attempts to remove the ink by application and removal of an aggressive pressure sensitive adhesive tape. All images show good abrasion and tape adhesion results.

Comparative Example A

PVF Film without Hydrophobic Ink Receptive Polymer Coating

A polyvinyl fluoride film is produced as described in Example 1. The film is corona discharge treated but no ink receptive coating is applied to the film. Printing is attempted on the same piezoelectric drop-on-demand ink jet printer used in Example 1. Printing attempts fail. The ink puddles on the fluoropolymer surface and runs.

Example 2

PVF Film with Amine Functional Acrylic Copolymer Receptive Coating

An article in accordance with the invention is produced using the clear protective film prepared in Example 1. The ink receptive acrylic layer is a heat activatable adhesive used to bond the image bearing fluoropolymer film to a substrate.

A substrate of white polyvinyl fluoride film permanently bonded to an aluminum panel is prepared. The aluminum panel is coated with a combination of 28 parts amine functional acrylic adhesive 68070 available from The DuPont Company, Wilmington, Del. and 1 part of an epoxy functional crosslinker EPON® 828 available from Ashland Chemical, Dublin, Ohio. The coated panel is dried in a 250° F. (121° C.) oven for 3 minutes. White polyvinyl fluoride film activated for adhesion by flame treatment is place in contact with the adhesive side of the panel and bonded in a hydraulic press at 325° F. (163° C.) and 100 psi (689 kPa) for 3 minutes.

The clear protective polyvinyl fluoride film prepared in Example 1 is placed against the white polyvinyl fluoride film of the substrate so that the inner surface (i.e., the surface having the acrylic coating and image) of the protective film is in contact with the white polyvinyl fluoride film. The film/substrate is placed in a hydraulic press and the press is heated to 360° F. (182° C.) for 5 minutes to bond the protective film to the white polyvinyl fluoride film side of the aluminum panel. The film/substrate is cooled to room temperature and the PET carrier layer is removed from the protective clear polyvinyl fluoride film to produce an article according to the invention wherein the image is viewable through and protected by the fluoropolymer film.

The article is subjected to accelerated weathering studies. At 2400 kilojoules (roughly 3 years Florida vertical exposure) with no visual deterioration in image being observed.

Example 3

Pressure Sensitive Adhesive Overcoat on PVF Film with Amine Functional Acrylic Copolymer Receptive Coating An article in accordance with the invention is produced using the clear protective film prepared in Example 1. The ink receptive acrylic layer is overcoated with a pressure sensitive adhesive to bond the image bearing fluoropolymer film to a substrate.

The clear protective polyvinyl fluoride film prepared in Example 1 is overcoated on its inner surface (i.e., the surface having the acrylic coating and image) with a white pressure sensitive transfer adhesive layer on a temporary liner of silicone coated paper at room temperature using a nip. The pressure sensitive white transfer adhesive used in this process is Flexmount TT 200 EXV-630 White available from Flexcon, Spencer, Me. The temporary liner from the pressure sensitive transfer adhesive is removed. The inner surface of the clear protective film with pressure sensitive adhesive is placed against a bare aluminum panel in a nip at a pressure of 40 psi (276 kPa). The PET carrier layer is removed from the protective clear polyvinyl fluoride film to produce an article according to the invention wherein the image is viewable through and protected by the fluoropolymer film.

The article is subjected to accelerated weathering studies. At 1200 kilojoules (roughly 1.5 years Florida vertical exposure) with no visual deterioration in image being observed.

Example 4

PVF Film with Amine Functional Acrylic Copolymer Receptive Coating

Clear, corona treated polyvinyl fluoride film as prepared in Example 1 is coated with an ink receptive coating of methyl methacrylate/butyl methacrylate/2-hydroxy-3-aminopropyl methacrylate 32/64/4 copolymer using a wire wound rod and dried in frames 5 minutes at 120 C. Small samples (8.5 inches×11 inches, 22 cm×28 cm) are cut and taped to a vinyl fabric and then fed through a VUTEk® UltraVu 2360 SC printer (VUTEk, Meredith N.H.). Printed images prepared in this way are bright and attractive and are undamaged by the ASTM method D 3359A Tape adhesion test showing neither ink or coating removal.

In contrast, a solution polyester coating (Bostik 7132 from Bostik, Middleton, Me.) is applied to the same PVF film and is printed with a VUTEk® UltraVu 2360 SC printer. The polyester coating and ink have marginal adhesion to the PVF film and are nearly completely removed when applying the tape adhesion test.

Example 5

Crosslinked Polyester Urethane Receptive Coating

As described in Example 4, small samples of printed clear, corona treated polyvinyl fluoride film with ink receptive coating are prepared with the exception that the ink receptive coating is aliphatic polyester urethane (PEU) from adipic acid based polyester, Pliobond-4549 (Ashland, Dublin Ohio) and hexamethylenediisocyanate trimer, Desmodur-3300 (Bayer, Pittsburgh, Pa.). Printed images prepared in this way are bright and attractive and are undamaged by the ASTM method D 3359A Tape adhesion test.

Example 6

Crosslinked Polyester Urethane Receptive Coating

As described in Example 4, small samples of printed clear, corona treated polyvinyl fluoride film with ink receptive coating are prepared with the exception that the ink receptive coating is aliphatic polyester urethane (PEU) from adipic acid based polyester, Pliobond-4464 (Ashland) and hexamethylenediisocyanate trimer, Desmodur-3300 (Bayer). Printed images prepared in this way are bright and attractive and are undamaged by the ASTM method D 3359A Tape adhesion test.

Example 7

Printed FEP Film

As described in Example 4, small samples of printed clear film with ink receptive coating are prepared with the exception that the fluoropolymer film used is a film of fluorinated ethylene/propylene copolymer, FEP 1100C available from DuPont Fluoropolymers, Wilmington, Del. Printed images prepared in this way are bright and attractive and are undamaged by the ASTM method D 3359A Tape adhesion test.

Example 8

Printed PFA Film

As described in Example 4, small samples of printed clear film with ink receptive coating are prepared with the exception that the fluoropolymer film used is a film of tetrafluoroethylene/perfluoro(alkyl vinyl) ether copolymer, PFA 100CLP available from DuPont Fluoropolymers, Wilmington, Del. Printed images prepared in this way are bright and attractive and are undamaged by the ASTM method D 3359A Tape adhesion test.

Example 9

Printed ETFE Film

As described in Example 4, small samples of printed clear film with ink receptive coating are prepared with the exception that the fluoropolymer film used is a film of ethylene/tetrafluoroethylene ether copolymer, Tefzel® 100CLZ available from DuPont Fluoropolymers, Wilmington, Del. Printed images prepared in this way are bright and attractive and are undamaged by the ASTM method D 3359A Tape adhesion test.

Example 10

Crosslinked Amine Functional Acrylic Copolymer Receptive Coating

Clear, corona treated polyvinyl fluoride film as prepared in Example 1 is coated with an ink receptive coating of methyl methacrylate/butyl methacrylate/butyl acrylate/1-aminoisopropyl methacrylate 33/44/8/15 and bisphenol-A diglycidyl ether crosslinker (Epon 828 from Ashland), 14 parts acrylic to 1 part epoxy crosslinker, using a wire wound rod and dried in frames for 5 minutes at 248° F. (120° C.). Small samples (2 inches×4 inches, 5 cm×10 cm) are placed upon a hot plate and heated to 160° F. (71° C.) with the coated side up. These hot samples are then misted with Inkware Type 3 black ink using an air brush so that tiny individual dots are produced. Microscopic examination at 100× reveals a variety of dot sizes many of which are in the range of 90 to 120 microns which is approximately the same size produced by an Ultravu 2360 printer. These dots are uniform and opaque and judged to be suitable for producing attractive images. These samples are also undamaged by the ASTM method D 3359A Tape adhesion test.

Example 11

Weathering Studies

Samples of clear, corona discharge treated polyvinyl fluoride film are coated with ink receptive composition as described in Example 1. Single pigment color blocks are printed with a VUTEk® UltraVu 2360 SC printer onto the polyvinyl fluoride film samples. Printed samples labeled A are then laminated to an aluminum substrate with a white transfer adhesive (Flexmount EXV 630 available from Flexcon) so that the ink is in contact with the transfer adhesive and protected by the fluoropolymer film containing light stabilizers. Printed samples labeled B are laminated to an aluminum substrate by applying the transfer adhesive to the uncoated side of the fluoropolymer film leaving the ink and ink receptive coating unprotected and subject to exposure. Samples are then exposed to SAE J1960 xenon arc accelerated weathering. Color changes (Delta E) in the blocks of printing after 2400 kilojoules exposure (roughly 2 years Florida vertical exposure) and 6000 kilojoules exposure (roughly 5 years Florida vertical exposure) are recorded in Tables 1 and 2. The greater loss of color for unprotected Samples B as compared to protected Samples A confirms the advantage of the structure of this invention wherein the fluoropolymer film on the outer surface which contains light stabilizers protects the ink from exposure to the weather.

TABLE 1

Color Change (Delta E) After 2400 Kilojoules Exposure

| Color | Samples A | Samples B |
| --- | --- | --- |
| Blue | 0.9 | 4.2 |
| Red | 5.1 | 8.9 |
| Yellow | 7.5 | 56.1 |
| Black | 3.4 | 0.9 |

TABLE 2

Color Change (Delta E) After 6000 Kilojoules Exposure

| Color | Samples A | Samples B |
| --- | --- | --- |
| Blue | 4.4 | 19.7 |
| Red | 9.1 | 33.8 |
| Yellow | 16.9 | 73.7 |
| Black | 1.7 | 7.3 |

What is claimed is:
1. A process for making an article with an image protected by a clear fluoropolymer film having an inner and an outer surface, said process comprising:

coating said inner surface of said fluoropolymer film with a layer of hydrophobic, ink receptive polymer composition compatible with said fluoropolymer film to form a hydrophobic, ink receptive polymer layer;

printing an image on said layer of hydrophobic, ink receptive composition using an inkjet printhead supplied with a non-aqueous solvent based ink; and adhering said clear fluoropolymer film to a substrate with said inner surface facing said substrate whereby said image is viewable through and protected by said fluoropolymer film.

2. The process of claim 1 wherein said printhead is operated by applying a voltage pulse to a piezoelectric crystal in contact with a supply of said non-aqueous solvent based ink resulting in generating a pressure pulse in said inkhead for emission of said ink.

3. The process of claim 1 wherein said hydrophobic, ink receptive polymer composition provides balanced solvent absorption of the solvent in the non-aqueous solvent based ink.

4. The process of claim 1 wherein said hydrophobic, ink receptive polymer composition comprises a polymer selected from amine functional polymers and aliphatic polyesters and their crosslinked polyester-urethane products.

5. The process of claim 1 wherein said hydrophobic, ink receptive polymer composition comprises a crosslinked polymer.

6. The process of claim 1 wherein said hydrophobic, ink receptive polymer composition is a heat activatable adhesive and wherein said adhering includes applying heat to activate said heat activatable adhesive.

7. The process of claim 1 wherein said hydrophobic, ink receptive polymer composition comprises an amine functional polymer.

8. The process of claim 1 wherein said hydrophobic, ink receptive polymer composition compatible with said fluoropolymer film comprises an amine functional acrylic copolymer.

9. The process of claim 1 wherein said hydrophobic, ink receptive polymer composition compatible with said fluoropolymer film comprises an amine functional acrylic copolymer that is crosslinked.

10. The process of claim 1 further comprising applying a pressure sensitive adhesive to said inner surface of said fluoropolymer film already having said hydrophobic ink receptive composition and printed image and wherein said adhering includes applying pressure to activate said pressure sensitive adhesive.

11. The process of claim 10 wherein said hydrophobic, ink receptive composition is compatible with said pressure sensitive adhesive.

12. The process of claim 1 wherein said fluoropolymer is selected from polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, and vinyl fluoride and blends thereof and blends of said polymers with a nonfluoropolymer.

13. The process of claim 12 wherein said fluoropolymer is selected from polyvinyl fluoride, fluorinated ethylene/propylene copolymer, ethylene/tetrafluoroethylene copolymer, tetrafluoroethylene/perfluoro(alkyl vinyl ether) copolymer, polyvinylidene fluoride and a blend of polyvinylidene fluoride and an acrylic polymer.

14. The process of claim 1 wherein said fluoropolymer film is formed by extrusion.

15. The process of claim 14 wherein said fluoropolymer film is oriented.

16. The process of claim 1 wherein said fluoropolymer film is formed by casting.

17. The process of claim 1 wherein said fluoropolymer film or said hydrophobic, ink receptive polymer composition or both said fluoropolymer film and said ink receptive polymer composition contain a light stabilizer.

* * * * *